United States Patent
Danknick

(10) Patent No.: US 6,856,416 B1
(45) Date of Patent: *Feb. 15, 2005

(54) DYNAMIC LOAD BALANCING FOR A TANDEM PRINTING SYSTEM

(75) Inventor: Daniel A. Danknick, Orange, CA (US)

(73) Assignee: Toshiba Tech Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,353

(22) Filed: Apr. 26, 2000

Related U.S. Application Data

(60) Provisional application No. 60/163,344, filed on Nov. 3, 1999.

(51) Int. Cl.$^7$ .............................................. G06K 15/00
(52) U.S. Cl. ...................................... 358/1.15; 358/1.14
(58) Field of Search ................................ 358/1.1, 1.13, 358/1.14, 1.15, 404, 405, 407, 468; 710/13, 16, 17, 19, 48, 58, 59, 62, 15

(56) References Cited

U.S. PATENT DOCUMENTS 6,606,165 B1 * 8/2003 Barry et al. ................. 358/1.9

* cited by examiner

*Primary Examiner*—Arthur G. Evans
(74) *Attorney, Agent, or Firm*—Tucker Ellis & West LLP

(57) ABSTRACT

The disclosure relates to methods and apparatus for allocating a print job among multiple printers. The apparatus includes one or more computer workstations that are communicatively coupled to a controller. The controller is communicatively coupled to plural multifunction peripherals (MFPs) for printing. The system provides a user an option of designating a print job as a tandem mode job, wherein a controller utilizes the multiple MFPs in printing the job in order to decrease the overall print time. In one embodiment, the controller utilizes only two MFPs. In another embodiment, more than two MFPs are utilized. Regardless of the number of MFPs utilized, all of the MFPs are desirably controlled by the same controller.

12 Claims, 5 Drawing Sheets

DYNAMIC LOAD BALANCING FOR A TANDEM PRINTING SYSTEM

RELATED APPLICATION INFORMATION

This application claims priority to U.S. Provisional Patent Application Ser. No. 60/163,344, entitled "Dynamic Load Balancing for a Tandem Printing System," filed Nov. 3, 1999, which is incorporated herein by reference.

This application is related to the following U.S. provisional patent applications, each of which is incorporated herein by reference: (I) U.S. Provisional Patent Application Ser. No. 60/163,360, entitled "Synchronous Printing," filed Nov. 3, 1999; (2) U.S. Provisional Patent Application Ser. No. 60/163,343, entitled "Generation of Cover Sheets by a Networked Printer," filed Nov. 3, 1999; and (3) U.S. Provisional Patent Application Ser. No. 06/163,272, entitled "Error Management for a Tandem Printing System," filed Nov. 3, 1999.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to image forming apparatuses and, more particularly, relates to methods and apparatuses for allocating print jobs among plural image forming apparatuses.

2. Description of Related Art

One primary feature in an effective print system is the amount of time that it takes to output a print job. Generally, a user desires to output a print job as quickly as possible. Toward this end, most contemporary operating systems, such as Microsoft Windows, permit a user to print a document to any number of printers that communicate with a computer workstation.

The host computer is often a computer workstation on a network. The application program sends the document to a printer driver, which, in conjunction with the operating system, converts the document into a language readable by the printer, which sometimes comprises the combination of a printer controller coupled to a print engine. The document is formatted by the printer controller and sent to the print engine for printing. Each step in this process is desirably performed in an efficient manner in order to minimize the time required for the printer to start outputting the document.

Often, the user desires to print multiple copies of a document using a single print command. Most document processing applications, such as word processors, allow the user to specify a multiple copy count for a print job, wherein the printer prints multiple copies of a document. If a single printer is charged with printing the multiple copies, the amount of time required for printing increases as the number of copies increases because the single printer bears the entire print load. One way of decreasing the amount of time required to print multiple copy print jobs is by allocating the copies among multiple printers. The copies are desirably allocated in an efficient manner in order to reduce the amount of time required to print the entire job.

However, several complications are introduced when dividing a print job among several copiers. First, the output of the printers must be properly managed to ensure that the printers only output the desired number of copies of a document. It is an inefficient use of both time and resources if any of the printers output extra copies of a document. Additionally, the status of each of the printers must be monitored to ensure that none of the printers are interrupted while printing a print job, such as when an error occurs. None of these complications are present where a single printer outputs an entire print job.

SUMMARY OF THE INVENTION

The previously described problems are solved by the image processing and output system disclosed herein. The system includes one or more computer workstations that are communicatively coupled to a controller. The controller is communicatively coupled to plural multifunction peripherals (MFPs) for printing. The controller divides multiple copies of a print job between the multiple MFPs in order to decrease the overall print time. In one embodiment, the controller utilizes only two MFPs. In another embodiment, more than two MFPs are utilized. Regardless of the number of MFPs utilized, all of the MFPs are desirably controlled by the same controller.

The apparatus and process described herein desirably provides improved job processing capacity and higher reliability. In utilizing multiple MFPs, the controller initiates a process, referred to as dynamic load balancing, by which the progress of a print job is continually monitored, particularly with respect to the copy count of the print job. For a multiple copy print job, the controller actively adjusts the remaining copy count as the MFPs prints each copy of a document. Additionally, the controller monitors error occurrences with respect to print jobs and reroutes interrupted print jobs from a stalled or failed MFP to a functioning MFP. The controller also prevents a print job from being rerouted more than a predetermined number of times.

Still further objects and advantages attaching to the device and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
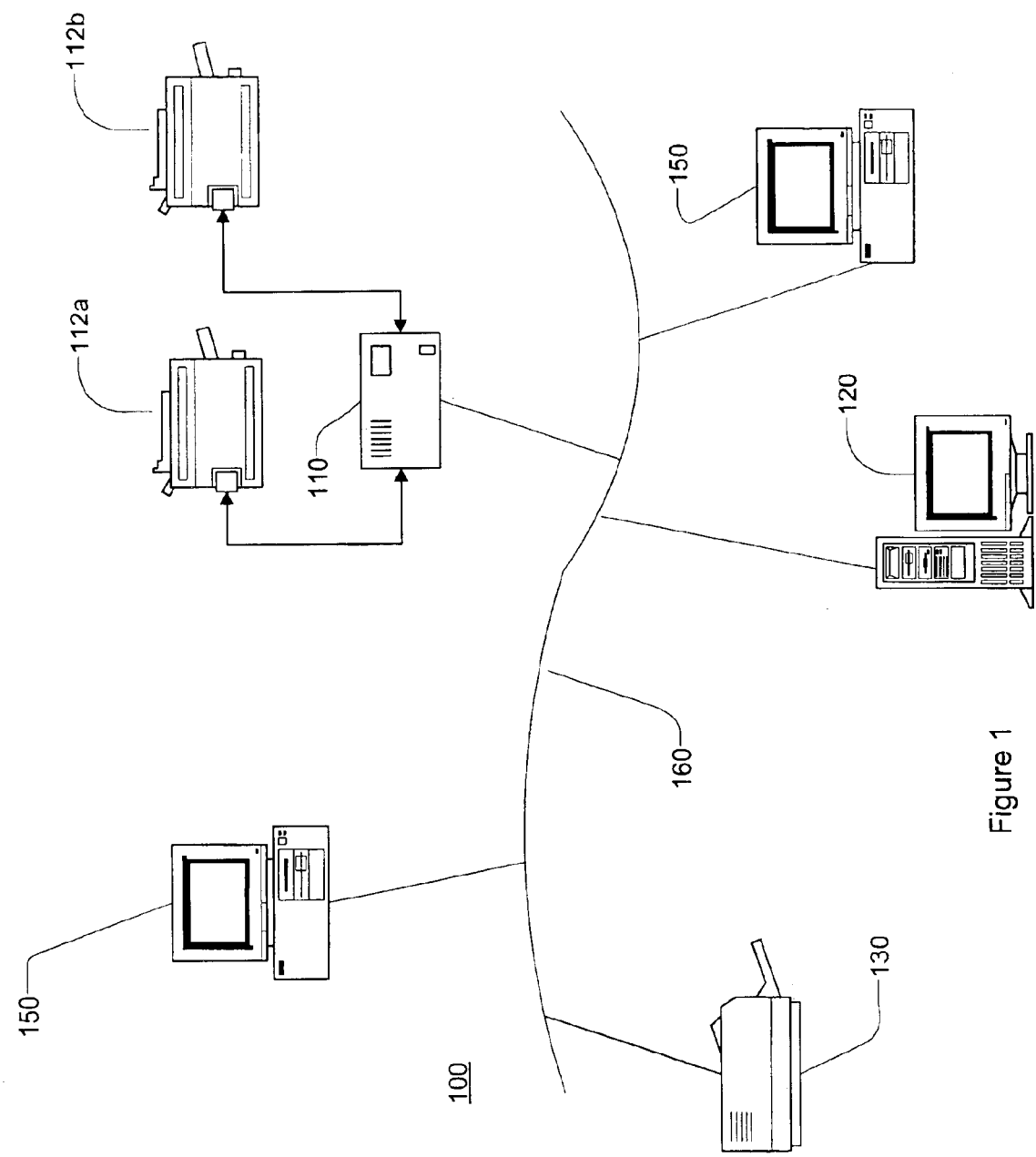
FIG. 1 is a block diagram of a LAN including a plurality of multifunction peripherals.

Referring now to FIG. 1 there is shown a block diagram of a local area network (LAN) 100 in accordance with the present invention. The LAN 100 includes a file server 120, printer 130, workstations 150, and a controller or Host 110 coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows or Windows NT operating systems. One or more hard output units or multifunction peripherals (MFP) 112a and 112b (collectively multifunction peripherals 112) are communicatively coupled to the Host 110. The LAN 100 may also include hubs, routers and other devices (not shown).

Before proceeding to describe the LAN 100, a few terms are defined. By "file server," it is meant a computer which controls access to file and disk resources on a network, and provides security and synchronization on the network through a network operating system. By "server," it is meant hardware or software which provides services to other hardware or software. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, typically providing printing and at least one of: copying, scanning and faxing.

By "printer driver" it is meant (1) a program which takes into account the physical characteristics of a printer and which is used to convert graphics and text into device-specific data at the time of printing; or (2) a file which describes the physical characteristics of a printer and which is used by an operating system or other software to convert text and graphics into device-specific data at the time of printing.

Figure 2:
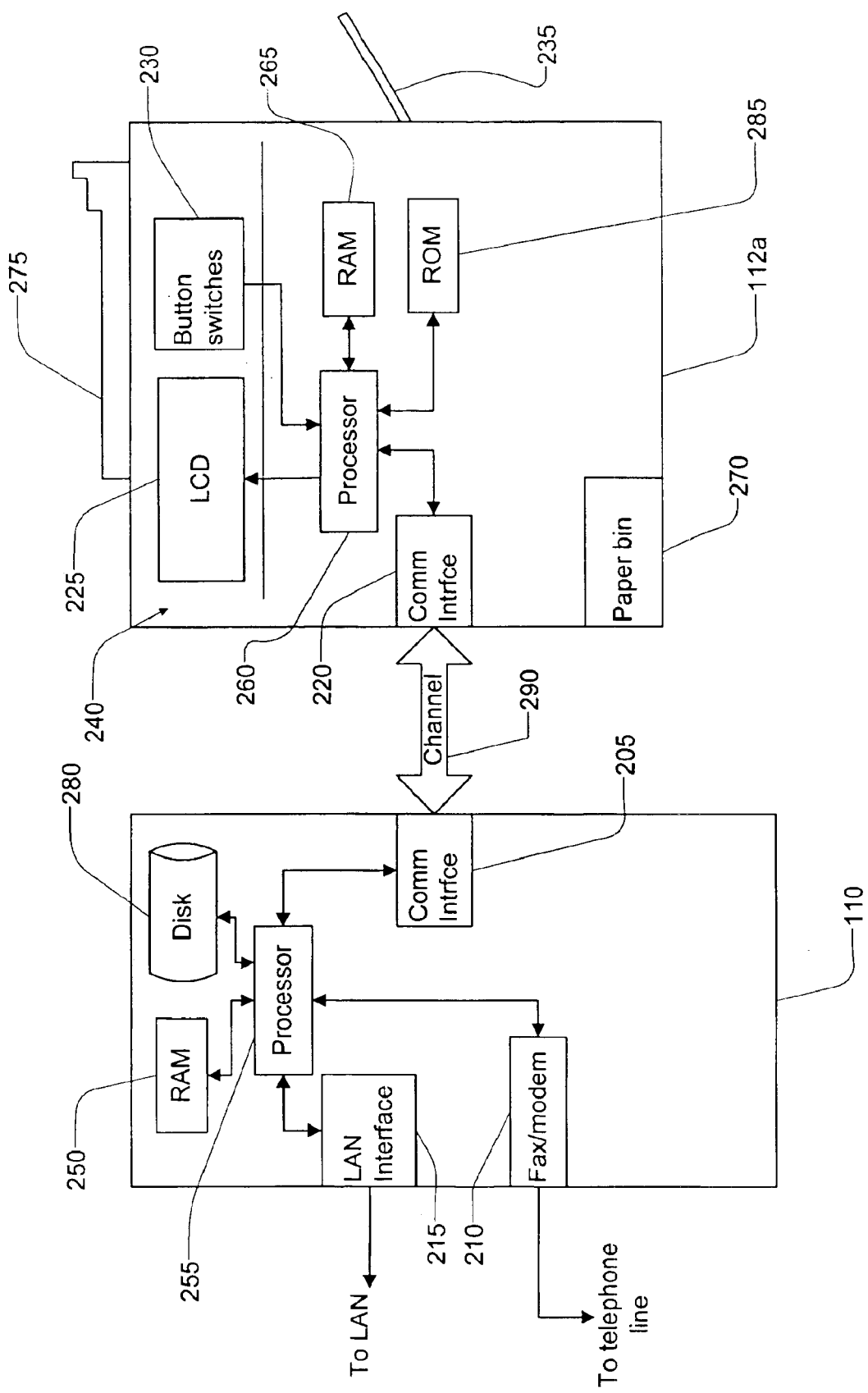
FIG. 2 is a block diagram of a data processing system including a Host and a first multifunction peripheral.

Turning now to FIG. 2, there is shown a block diagram of a data processing system comprising the MFP 112a and the Host 110. Each of the MFPs 112a and 112b are configured as shown in FIG. 2 and are communicatively coupled to the same Host 110 as shown in FIG. 2. However, for ease of illustration, FIG. 2 shows only a single MFPs 112a. The following description of MFP 112a applies equally to MFP 112b.

The MFP 112a preferably comprises a high output digital copier having a communications interface 220, which as presently embodied comprises a small computer systems interface (SCSI). The MFP 112a further preferably comprises a hardware and software interface which allows the MFP 112a to receive rasterized print jobs from the Host 110, manage the print jobs as well as its own copy jobs, and print the print jobs. The hardware and software interface of the MFP 112a further allows the MFP 112a to forward facsimile send jobs from the MFP 112a to a fax/modem 210 in the Host 110. The MFP 112a includes a short term memory 265, which preferably comprises random access memory (RAM) and a processor 260 in which programs are stored and run, respectively, for controlling the functions of the MFP 112a. The MFP 112a preferably also includes a long term memory 285 such as a read only memory (ROM) or electronically programmable read only memory (EPROM). The MFP 112a may also include a disk drive (not shown) for both long term and short term storage. The MFP 112a includes standard components including an automatic document feeder 275, paper bin 270 and paper output tray 235.

The MFP 112a includes a non-fixed display 225, preferably a liquid crystal display (LCD), and a user input device 230, such as button switches. The MFP 112a has user interface software stored in the memory 285 which is responsible for displaying information on the display 225 and interpreting user inputs from the user input device 230. The non-fixed display 225 and user input device 230 comprise an operator console 240, which, together with the user interface software, comprise a panel subsystem.

The Host 110 preferably comprises a server, and is a computer having an Intel processor 255 and running Microsoft Windows NT. In conjunction with the processor 255, the Host 110 has a short term memory 250 (preferably RAM) and a long term memory 280 (preferably a hard disk) as known in the art. A fax/modem 210 is for sending and receiving facsimiles via telephone lines. The Host 110 preferably provides storage, for example in long term memory 250, for holding incoming facsimile transmissions for extended periods and in substantial amounts when a hold is placed on printing facsimile jobs. The Host 10 includes a communications interface 205 through which the Host 110 communicates with the MFPs 112 via a channel 290. Preferably, the communications interface 205 is configured as a SCSI Host.

The Host 110 further preferably comprises a hardware 215 and software interface which allows the Host 110 to receive print jobs and facsimile send jobs from the LAN 100, receive facsimile jobs from the MFPs 112 and transmit rasterized print jobs to the MFP 110. The Host 110 includes management software stored in the long term memory 280 for managing print jobs, facsimile jobs and scan jobs. The Host 110 rasterizes print jobs received from the computer workstation 150 via the LAN 100 into print data (in a form native to the MFPs 112) and transmits the print data to the MFPs 112 via the communications interface 205. The Host 110 executes facsimile send jobs, received from either the LAN 100 or the MFPs 112, on the fax/modem 210. A user can submit a print job to the Host 110 from any of the workstations 150. A "print job" is defined as a file containing data descriptive of a document to be printed, contrasted with documents in various application formats. When submitting a print job request, the user preferably specifies a copy count, which is the number of copies of the document in the print job that the user desires to be printed. The copy count can be any whole number greater than or equal to 1. Preferably, the computer workstation 150 embeds within a print job a command that specifies the number of copies in the job's copy count.

Preferably, a user interface software on the computer workstation allows the user to designate a print job as either a standard mode print job or as a tandem mode print job. In the standard mode, the Host 110 utilizes only a single MFP 112 for print jobs. The Host 110 sends the entire copy count in the print job to the single MFP 112. The single MFP 112 then prints all of the copies in the copy count.

In the tandem mode, the Host 110 utilizes multiple MFPs 112 in printing a job in order to decrease the overall print time. The Host 110 assigns each MFP 112 the task of printing one or more complete copies of the document in the print job. In one embodiment, the Host 110 utilizes only two MFPs 112. In another embodiment, more than two MFPs 112 are utilized. Regardless of the number of MFPs 112 utilized, the Host 110 desirably controls all of the MFPs 112 that are printing the print job.

For print jobs with a copy count greater than 1, tandem mode desirably provides improved job processing capacity and higher reliability than standard mode. In utilizing multiple MFPs 112 in tandem mode, the Host 110 preferably initiates a process, referred to as dynamic load balancing ("DLB"), by which the progress of a print job is continually monitored, particularly with respect to the copy count of the print job. The Host 110 preferably keeps track of how many copies have been printed. As the MFPs 112 print each complete copy of a document, the Host 10 also actively tracks the number of copies in the copy count that remain to be printed. Additionally, the Host 112 preferably monitors error occurrences with respect to print jobs and reroutes interrupted print jobs from a stalled or failed MFP 112 to a functioning MFP 112. An error is any event that disables an MFP 112 from printing or causes an MFP 112 to interrupt the printing of a print job. An error may be caused by hardware or software malfunction or by user interaction, such as if a user manually interrupts an MFP 112 while the MFP 112 is printing.

When a user designates a print job as a tandem mode print job, the user interface software preferably provides the user with the option to designate one or more variations of tandem mode. A first variation is referred to a Print to Best. When the user selects Print to Best for a print job, the Host 110 sends the entire copy count of a print job to whichever MFP 110 can output the print job in the least amount of time. Another variation of tandem mode is referred to as Print to Multiple. In some embodiments, where there are only two MFPs, the tandem mode may be more preferably referred to as "Print to Both." When the user designates a print job as Print to Multiple, the Host 110 divides the copies in a multiple copy count print job between the available MFPs 112. That is, each MFP 112 is assigned the task of printing one or more complete copies of the document. The MFPs 112 thus share the duty of printing the multiple copies of a job.

Figure 3:
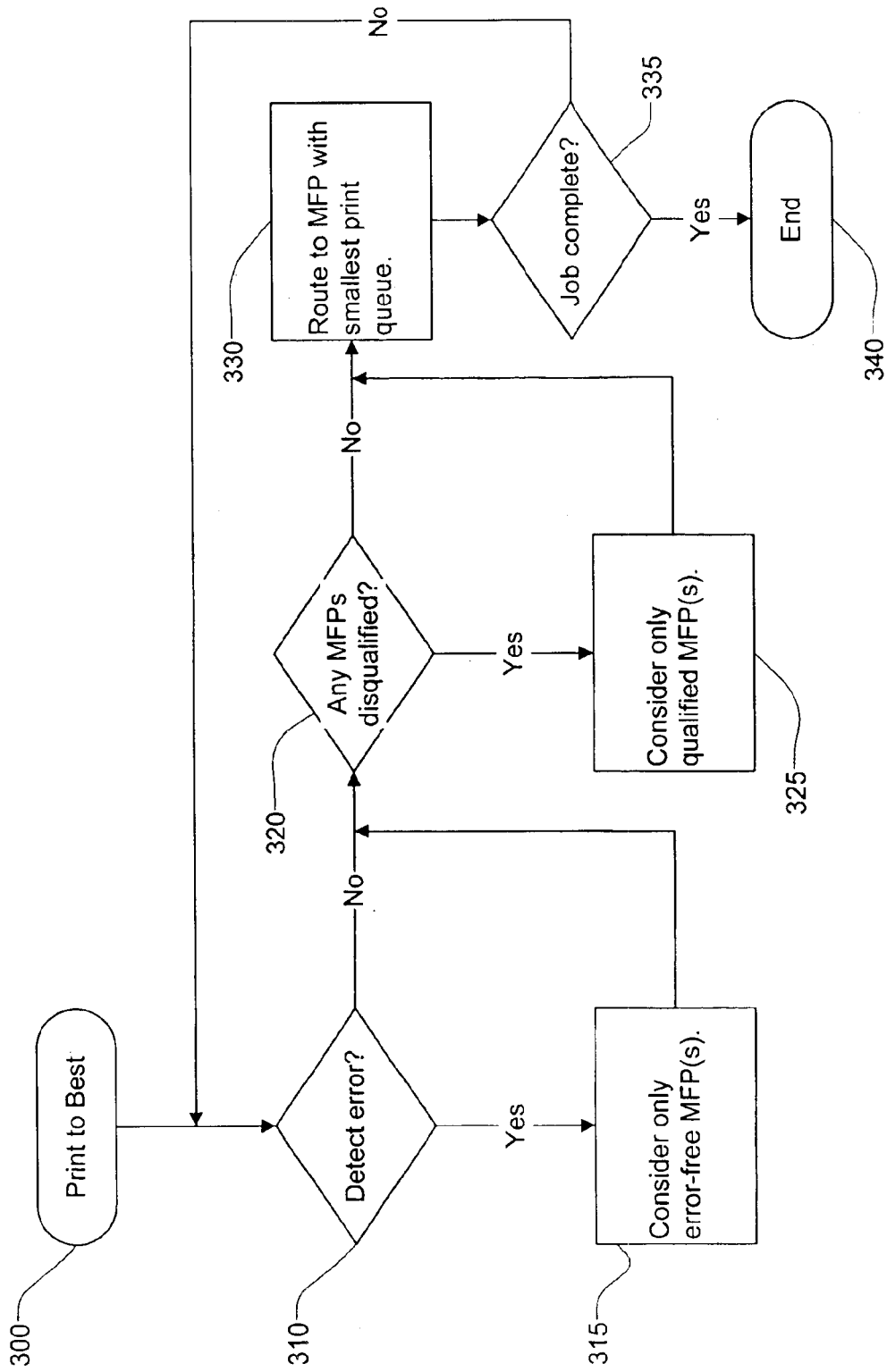
FIG. 3 is a flowchart relating to a method of routing a print job to a multifunction peripheral in order to minimize the required print time.

As mentioned, in the Print to Best printing mode, the Host 110 preferably sends print jobs to whichever MFP 112 that can output the print job in the least amount of time. FIG. 3 is a flow chart of a method by which the Host 110 selects an MFP 112 for a Print to Best job.

The process begins when a print job is received. The Host 110 preferably identifies one or more MFPs 112 that are eligible to receive the print job. Preferably, the Host 110 first polls the MFPs 112 and determines whether an error is present in any of the MFPs 112 (step 310). If an error is present in any one of the MFPs 112, then the Host 110 automatically disqualifies that MFP 112 for the print job and considers only the error-free MFPs 112 for receipt of the print job (step 315).

The Host 110 next determines whether any of the MFPs 112 should be disqualified from receiving a print job for other reasons (step 320). One reason for disqualification is that the MFP 112 is improperly formatted with respect to the finishing or paper requirements of the print job. For example, an MFP 112 may be disqualified from printing the job because the MFP 112 is equipped with the incorrect paper type. If any of the MFPs 112 are disqualified then the Host 110 preferably considers only the error-free, qualified MFP(s) 112 for receipt of the print job (step 325).

After the Host 110 identifies the qualified MFPs 112, then the Host 110 examines the print queues of each of the identified MFPs 112. The Host 110 preferably assigns the print job to the MFP 112 with the lowest quantity of print jobs in its print queue (step 330). The MFP 112 that is assigned the print job is referred to as the "assigned MFP 112." When the Host 110 assigns a print job to an MFP 112, the Host 110 either immediately sends the print job to the assigned MFP 112 for printing or places the print job in the assigned MFP's print queue. A print queue comprises a list of print jobs that are scheduled to be printed on an MFP 112. The Host 110 typically maintains a print queue for each of the MFPs 112 in memory local to the Host 110 and places print jobs in an MFP's queue in the order received from the workstations 150. The Host 110 then sends the print jobs to the MFPs 112 for printing in the same order as the jobs are arranged in the print queue.

Once the assigned MFP 112 begins printing a print job, the Host 110 keeps count of how many complete copies of the document in the print job that the assigned MEP 112 has printed. The Host 110 can thereby keep track of how many copies remain to be printed by subtracting the number of completely printed jobs from the copy count.

Until the all of the copies of the print job have been completely printed, the Host 110 preferably continually monitors the status of the assigned MFP 112 (steps 335). If the Host 110 detects that the assigned MFP 112 is unable to complete the print job due to an error, the Host 110 preferably identifies an alternate MFP 112 according to the criteria of steps 310, 320, and 330. Once the alternate MFP 112 is identified, the Host 110 assigns the alternate MFP 112 the task of printing the remaining copies in the copy count. Prior to assigning the print job to the alternate MFP 112, the Host preferably waits a predetermined time period to allow time for the error to be corrected. The Host 110 repeats steps 310–335 for the alternate MFP 112 until the entire copy count of the print job is completely printed.

Figure 4:
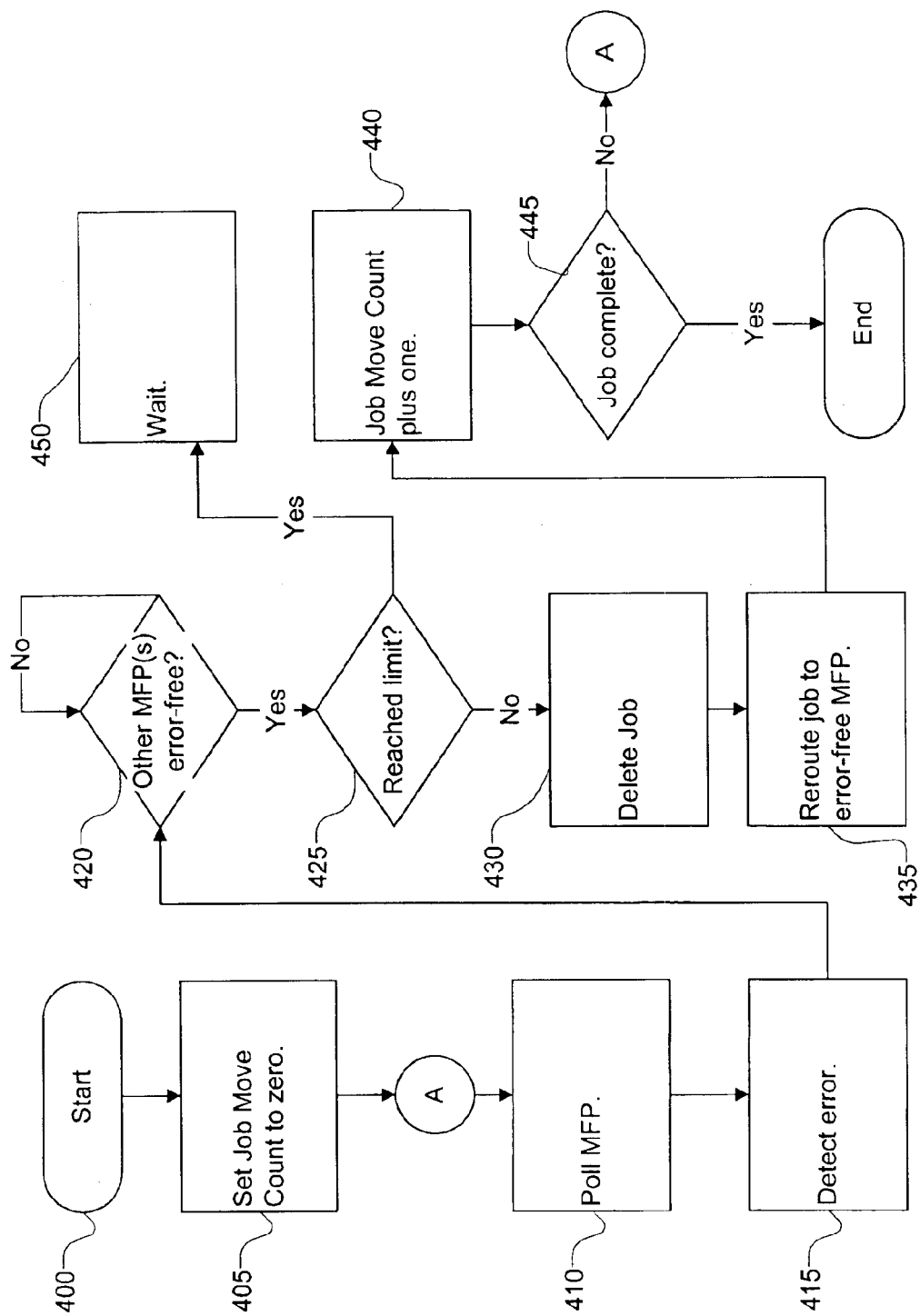
FIG. 4 is a flow chart of a method of inhibiting a print controller from infinitely rerouting a print job between multiple multifunction peripherals.

Although it is desirable to reroute a print job that is interrupted due to an error, the dynamic load balancing feature desirably prevents the Host 110 from infinitely rerouting print jobs back and forth between MFPs 112. FIG. 4 shows a flow chart of a method of preventing the Host 110 from infinitely rerouting a print job back and forth between MFPs 112. The process begins when the Host 110 sends a print job to an MFP 112 (the "assigned MFP 112") for printing. For a given print job, the Host 110 preferably keeps a record of the number of times that the print job has been rerouted from one MFP 112 to another MFP 112. The record is referred to as the Job Move Count. In step 405, the Host 110 sets the Job Move Count for the current print job to zero. The Host 110 then polls the assigned MFP 112 to ascertain the status of the assigned MFP 112 with respect to the print job (step 410).

In step 415, the Host 110 detects an error in the assigned MFP 112 with respect to the print job. The Host 110 preferably then determines whether any other MFPs 112 are error-free and identifies such MFPs 112 (step 420). If the Host 110 identifies an error-free MFP 112, the Host 110 then examines the Job Move Count and determines whether the Job Move Count has reached a maximum limit (step 425). If the Job Move Count has reached the limit then the Host 110 does not reroute the print job to another MFP 112. The Host 110 preferably waits a predetermined time span to provide time for correction of the error (step 450). The error can be corrected by user interaction or through action of the Host 110. Preferably, the Host deletes the print job from the print queue if the error is not corrected within the time span.

If the Host 110 determines that the Job Move Count has not reached the limit and if the Host identifies an error-free MFP 112, then the Host 10 deletes the print job from the assigned MFP 112 (step 430). The Host 110 then reroutes the print job to an error-free MFP 112 (the "alternate MFP 112") (step 435). As mentioned, the Host 110 preferably keeps track of how many complete copies of the document in the print job have already been printed. When rerouting the print job to the alternate MFP 112, the Host 110 includes instructions to print only the remaining number of copies in the print job.

The Host 110 then increases the Job Move Count for the print job by one (step 440). In step 445, the Host determines whether the print job is complete (step 445). The print job is complete when the entire copy count for the print job has been printed. If the job is not complete, then the Host 110 returns to step 410 and polls the MFP 112 that received the rerouted print job. The process is then continued for the new MFP 112. Advantageously, the monitoring of the Job Move Count record prevents the print job from being rerouted beyond a predetermined maximum limit.

Figure 5:
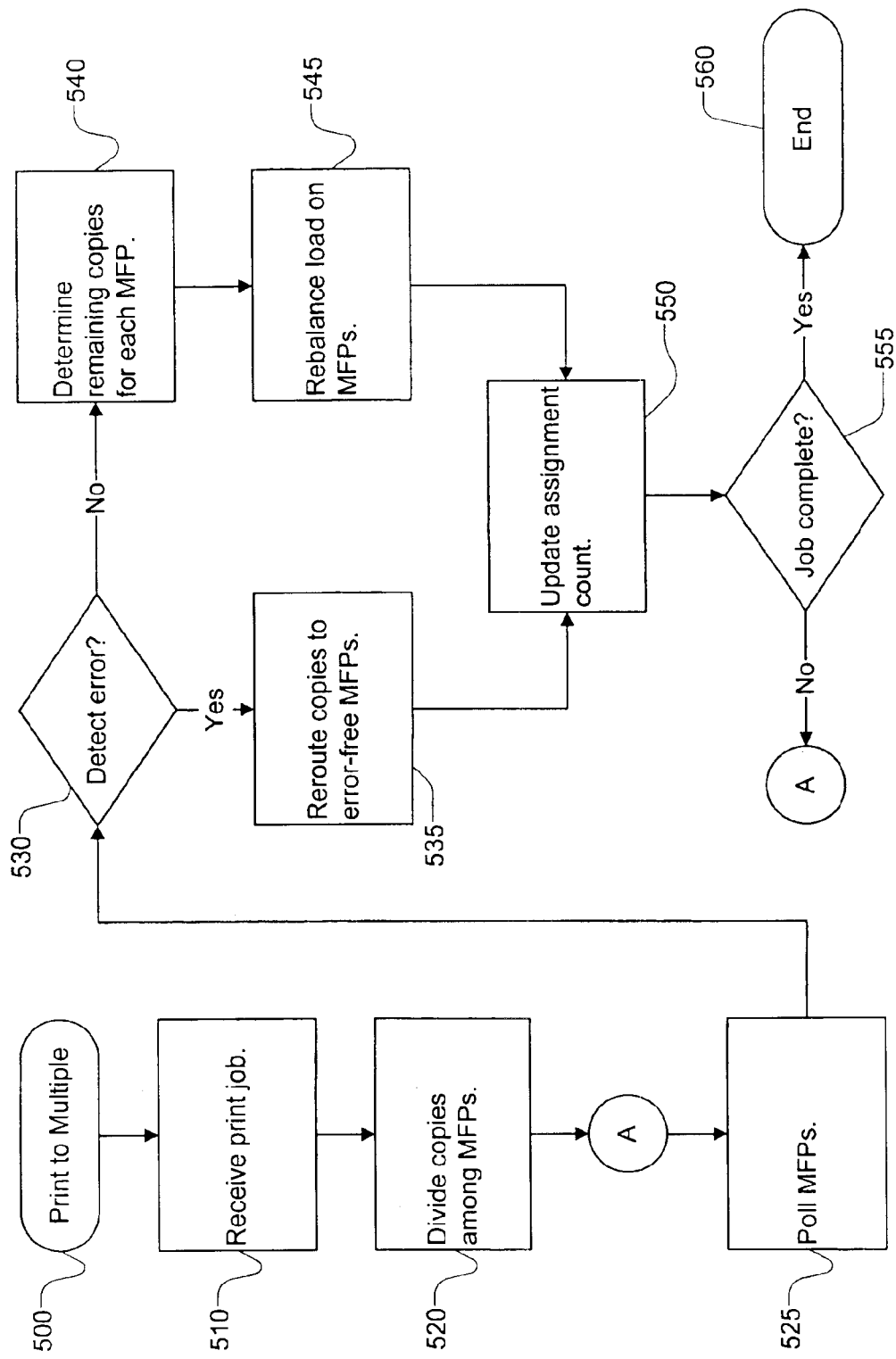
FIG. 5 is a flow chart of a method of allocating multiple-copy print jobs among plural printers.

FIG. 5 shows a flow chart that describes a method of allocating Print to Multiple print jobs among plural printers. The Print to Multiple option is preferably available for print jobs that have a copy count greater than 1. As mentioned, the Host 110 divides the copies in a Print to Multiple print jobs among the available MFPs 112 in order to decrease total print time. The method is described for an embodiment where two MFPs 112 are communicatively coupled to the Host 110, although the method can be modified for greater than two MFPs 112. The method begins when the Host 110 receives a Print to Best print job from the computer workstation 150 (step 510).

The Host 110 divides the copies in the copy count of the print job between the MFPs 112. In one embodiment, the Host 110 initially divides the copy count equally between the available MFPs 112. Thus, if two MFPs 112 are coupled to the Host 110, then the Host 110 divides the copy count by two. The Host 110 then assigns each MFP 112 the task of printing half the copy count. For example, if the copy count is eight, then the Host 110 initially sends instructions to each MFP 112 to print four complete copies of the document in the print job.

The Host 110 preferably periodically polls the status of each MFP 112 with respect to the print job (step 525). The Host 110 preferably keeps a running tab of how many complete copies of the print job document have been printed by each MFP 112 and how many complete copies remain to be printed. For reference purposes, the quantity of copies that remain to be printed for each MFP 112 is referred to herein as the MFP's "assignment count." The assignment count is an indicator of the load on each MFP 112. For each MFP 112, the Host 110 preferably reduces the assignment count by one every time the MFP 112 prints a complete copy of the document.

Additionally, the Host 110 monitors the status of the MFPs 112 for changes, particularly with respect to errors that cause printing interruption on any of the MFPs 112. If the Host 110 detects an error in one of the MFPs 112 (the error-ridden MFP 112) and detects no error in the other MFP 112 (the error-free MFP 112) (step 530), the Host 110 preferably reassigns at least a portion of the error-ridden MFP's printing duties to the error-free MFP. That is, the Host 110 increases the assignment count for the error-free MFP 112 and decreases the assignment count for the error-ridden MFP 112. The assignment count for the error-free MFP 112 is increased by the same amount that the assignment count for the error-ridden MFP is decreased. Prior to reallocating the assignment count, the Host 110 preferably waits a predetermined time span to allow time for the error to be corrected.

In one embodiment, the Host 110 reassigns the entire assignment count for the error-ridden MFP 112 to the error-free MFP 112. The error-ridden MFP112 is thereafter left with an assignment count of zero. The Host 110 increases the assignment count for the error-free MFP 112*b* accordingly. That is, the error-free MFP 112 is assigned the task of printing all the copies of the document that error-ridden MFP 112 did not complete.

In another embodiment, the Host 110 reassigns only a limited quantity of copies to the error-free MFP 112 from the error-ridden MFP 112. The error-ridden MFP 112 is preferably left with a limited assignment count so that if the error is corrected, the error-ridden MFP 112 can immediately start printing its assignment count. In such a case, the quantity of copies that the Host 110 reassigns preferably is determined by the rate at which each of the MFPs 112 can receive and process print data and the rate at which the MFPs 112 can print sheets of paper. In one embodiment, the Host 110 reassigns the lesser quantity of: (1) one-half of the quantity of total copies that remain to be printed by both MFPs 112; and (2) a quantity of copies K, where K is determined by the speed at which the error-ridden MFP 112 prints sheets of paper. For an MFP 112 that prints sheets at 65 pages per minute, K is equal to 3.

With reference now to step 540, if the Host 110 does not detect an error in either of the MFPs 112, the Host 110 nonetheless examines the assignment count for each MFP 112 in order to ascertain whether the print load is balanced between the MFPs 112. The Host 110 preferably maintains a balance between the assignment counts of each of the MFPs 112. For example, if the assignment count for one of the MFPs 112 falls below the assignment count of the other MFPs 112, then the Host 110 considers reassigning copies from the MFP 112 with the higher assignment count to the MFP(s) 112 with the lower assignment count. The assignment counts may be become unbalanced between the MFPs 112, for example, if one of the MFPs 112 is printing at a slower rate than the other MFPs 112.

For ease of reference, the quantity of copies remaining to be printed on the first MFP 112*a* is referred to as R1 and the quantity of copies remaining to be printed on the second MFP 112*b* is referred to as R2. The difference between R1 and R2, if any, is referred to as DR. If DR is zero, then MFP 112*a* and MFP 112*b* each has an equal quantity of copies of the document remaining to be printed. In such a case, the Host 110 does not reassign copies of the document from one MFP 112 to the other MFP 112. However, if DR is greater than zero, then one of the MFPs 112 has more copies remaining to be printed than the other MFP 112. The Host 110 preferably then re-balances the load on the MFPs 112 (step 545) if DR is greater than a predetermined value.

In one embodiment where DR is greater than zero, the Host 110 reassigns copies of the document from one MFP 112 to another MFP 112 as follows. Assuming that R1 is less than R2, the Host 110 reroutes copies from MFP 112a to MFP 112b if: (1) R1 is less than DR; and (2) R2 is greater than 2*DR. If the condition is satisfied, then the Host 110 increases the assignment count of MFP 112a and decreases the assignment count of MFP 112b by the minimum of: (1) one-half of the quantity of total copies that remain to be printed; and (2) the quantity K. As mentioned, K is equal to 3 for an MFP 112 that prints at a rate of 65 pages per minute. If R2 is less than R1, then the Host 110 reroutes copies from MFP 112b to MFP 112a if: (1) R2 is less than DR; and (2) R1 is greater than 2*DR.

The Host 110 preferably continually updates the assignment count for each MFP 112 as the MFPs 112 print copies of the document (step 550). Until the entire copy count of the print job is complete, the Host 110 preferably continues to monitor the status of the MFPs 112 with respect to the print job (step 555). If any errors are detected or if the assignment count becomes unbalanced, the Host 110 preferably adjusts the assignment count of each MFP 112 as described above.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of sending a print job from a computer workstation to one or more printers in a plurality of printers, each of the plurality of printers communicatively coupled to the same control unit, the control unit being communicatively coupled to a computer workstation on a computer network, the method comprising:
    (a) the control unit identifying one or more error-free printers;
    (b) the control unit polling the error free printers to ascertain a print queue for each printer, the print queue comprising a list of one or more print jobs scheduled to be printed by a printer;
    (c) the control unit identifying a first printer, the first printer comprising the error-free printer with the lowest quantity of print jobs in its print queue;
    (d) the control unit routing the print job to the first printer for printing;
    (e) the control unit monitoring a status of the print job with respect to the first printer;
    (f) the control unit detecting an error in the first printer with respect to the print job, wherein the error causes the first printer to be unable to complete the print job;
    (g) the control unit repeating (a) through (c) and identifying an alternate printer, wherein the alternate printer comprises the error-free printer with the lowest quantity of print jobs in its print queue;
    (h) the control unit deleting the print job from the first printer and rerouting the print job to the alternate printer for printing;
    (i) if the control unit detects an error in the alternate printer with respect to the print job, the control unit identifying subsequent alternate printers and rerouting the print job to the subsequent alternate printers until the print job is completely printed.

2. The method of sending a print job from a computer workstation to one or more printers in a plurality of printers of claim 1, wherein the Host maintains a Job Move Count record comprising the quantity of times that the Host reroutes the print job, wherein the Host does not reroute the print job if the Job Move Count has reached a predetermined maximum limit.

3. The method of sending a print job from a computer workstation to one or more printers in a plurality of printers of claim 1, wherein the print job comprises a single copy of a document.

4. The method of sending a print job from a computer workstation to one or more printers in a plurality of printers of claim 1, wherein the print job includes plural copies of a document and further comprising the control unit maintaining a copy count record that indicates the number of copies remaining to be printed, the control unit further keeping track of the number of complete copies of the document that are printed by the printers.

5. The method of sending a print job from a computer workstation to one or more printers in a plurality of printers of claim 1, the method further comprising the control unit receiving a print job from the computer workstation.

6. The method of sending a print job from a computer workstation to one or more printers in a plurality of printers of claim 1, the method further comprising the control unit polling the plurality of printers to determine whether any printers are disabled due to the presence of an error in the printer.

7. A control unit for instructing a printer to print a document, the control unit including computer readable software for causing the control unit to:
    (a) identify one or more error-free printers;
    (b) pool the error free printers to ascertain a print queue for each printer, the print queue comprising a list of one or more print jobs scheduled to be printed by a printer;
    (c) identify a first printer, the first printer comprising the error-free printer with the lowest quantity of print jobs in its print queue;
    (d) route the print job to the first printer for printing;
    (e) monitor a status of the print job with respect to the first printer;
    (f) detect an error in the first printer with respect to the print job, wherein the error causes the first printer to be unable to print the print job;
    (g) repeat (a) through (c) and identify an alternate printer, wherein the alternate printer comprises the error-free printer with the lowest quantity of print jobs in its print queue;
    (h) delete the print job from the first printer and rerouting the print job to the alternate printer for printing;
    (i) if the control unit detects an error in the alternate printer with respect to the print job, identify subsequent alternate printers and rerouting the print job to the subsequent alternate printers until the print job is completely printed.

8. The control unit of claim 7, wherein the computer readable software further causes the control unit to maintain a Job Move Count record comprising the quantity of times that the control reroutes the print job, and wherein the control unit does not reroute the print job if the Job Move Count has reached a predetermined maximum limit.

9. The control unit of claim 7, wherein the print job comprises a single copy of a document.

10. The control unit of claim 7, wherein the print job includes plural copies of a document and wherein the computer readable software further causes the control unit to maintain a copy count record that indicates the number of copies remaining to be printed, and to keep track of the number of complete copies of the document that are printed by the printers.

11. The control unit of claim 7, wherein the computer readable software further causes the control unit to receive a print job from the computer workstation.

12. The control unit of claim 7, wherein the computer readable software further causes the control unit to poll the plurality of printers to determine whether any printers are disabled due to the presence of an error in the printer.

* * * * *